Sept. 6, 1932.  G. SAUNDERS  1,875,936
OIL SAVER PACKING
Filed May 4, 1931

INVENTOR
*Gordon Saunders*
BY
*Westall and Wallace*
ATTORNEYS

Patented Sept. 6, 1932

1,875,936

UNITED STATES PATENT OFFICE

GORDON SAUNDERS, OF WHITTIER, CALIFORNIA

OIL SAVER PACKING

Application filed May 4, 1931. Serial No. 534,873.

This invention relates to a stuffing box and packing bushing having a special field of utility in oil savers wherein a reciprocable cable passes through a head. In such oil savers, a leak tight fit is desired between the cable and head. Tight packing is most needed upon the passage of the cable in an outward direction, due to violent pressures being developed at such times. The cable has a rugged outer surface and a flexible contact between cable and packing is desirable to provide a snug leak tight fit. Furthermore, due to the rugged outer surface of the cable, wear of the packing becomes excessive. It therefore is a desideratum to provide a packing in which frictional contact is relieved upon the in stroke of the cable. It is the primary object of this invention to provide a stuffing box with a packing bushing fulfilling the before mentioned needs and which is simple, economical and efficient.

An embodiment of the invention is illustrated in the accompanying drawing, in which:—

Figure 1:
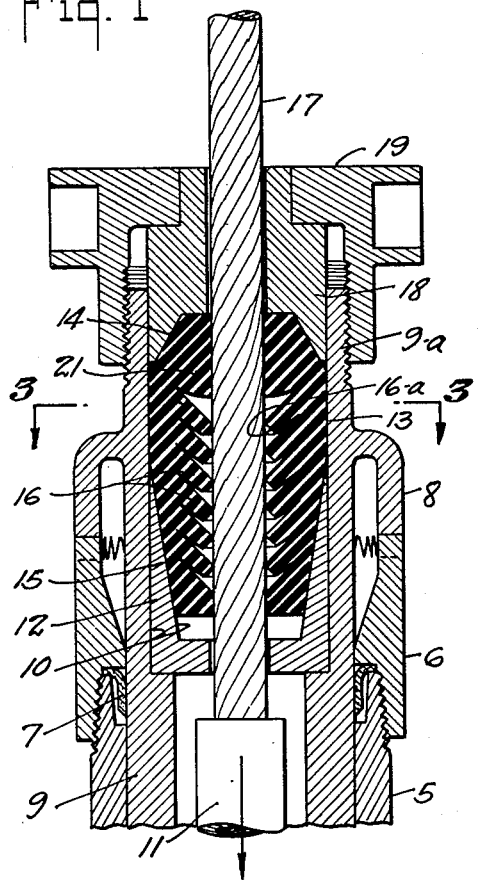
Figure 2:
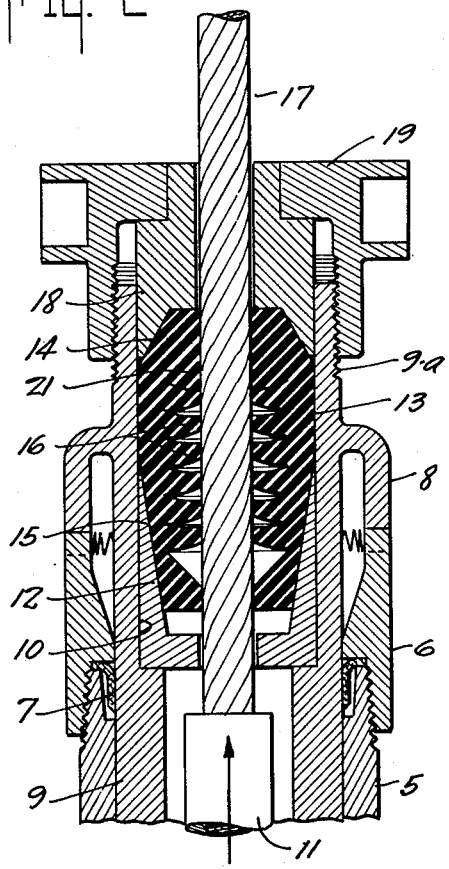
Figure 4:
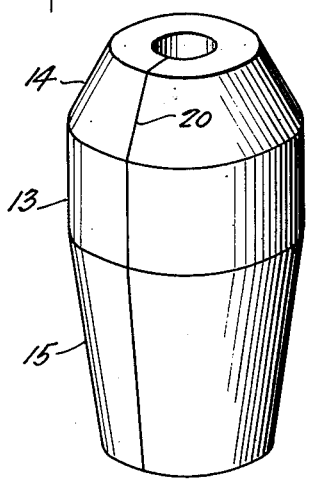
Figure 3:
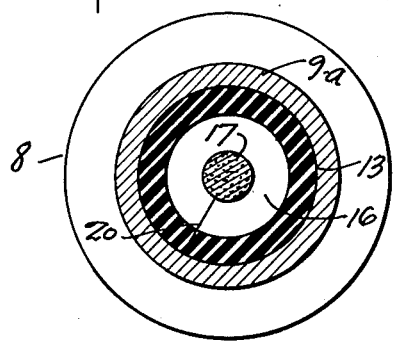

Fig. 1 is an axial section of the upper end of an oil saver including a stuffing box with the cable illustrated as travelling on its in stroke; Fig. 2 is a view similar to Fig. 1 showing the position of parts with the cable travelling on its out stroke; Fig. 3 is a section as seen on the plane designated 3—3 in Fig. 1; and Fig. 4 is a perspective view of the packing bushing.

Referring more particularly to the drawing, 5 indicates the base of an oil saver having a marginal sleeve section 6 attached thereto. A cup leather 7 is clamped between the base 5 and the sleeve section 6. Mounted over the sleeve section is a cap having a brim 8 and a cage 9. The upper end of the cage comprises an extension 9a exteriorly threaded. A packing pocket 10 is formed in the cage. Longitudinally movable in the cage is a retainer 11 forming a part of a releasable locking mechanism to hold the cap in position.

Within the packing pocket is a thimble 12 having a tapered bore. Within the thimble is mounted a packing bushing preferably formed of rubber having an intermediate cylindrical portion 13 and tapered ends 14 and 15. The tapered portion 15 corresponds with the tapered portion of the thimble. A bore extends through the bushing and this bore is lined by a corrugated wall formed of annular barbs 16 which normally range downwardly as shown in Fig. 1. The ends of the barb are blunt or substantially square cut as denoted by 16a so that when the barbs are in the position shown in Fig. 2 they will have a relatively large area of contact with the cable 17. A gland 18 is mounted over the upper end of the bushing and is adjustable by a nut 19. The cage 9, thimble 12, gland 18 and nut 19 provide a stuffing box with the external wall of the bushing contacting the wall of the stuffing box bore. It will be noted from an inspection of Figs. 3 and 4 that the bushing is split at 20 to enable it to be opened up and placed around the cable 17. The barbs 16 overlap and sufficient space is formed in the bore at the top to allow play of the barbs but a stop portion 21 prevents them from passing over center.

On the in stroke of the cable, as illustrated in Fig. 1, the barbs follow the cable exerting a very little frictional contact therewith, thereby relieving wear. On the out stroke of the cable as illustrated in Fig. 2, the bars are dragged upwardly and compressed longitudinally of themselves, fitting snugly against the cable. There is also a relatively large area of contact between the ends of the barbs and the cable. Any pressure of liquid tending to leak around the cable acts upon the barbs to further move them into intimate contact with the cable. Thus, a very effective packing is obtained.

What I claim is:—

1. A packing for oil savers and the like comprising a stuffing box, a bushing having a bore with flexible annular barbs all slanting in one direction for engagement with a line, said barbs having substantially square cut ends whereby the barbs will be compressed against the line on passage of the latter in one direction and will be released on passage of the line in the other direction.

2. A packing for oil savers and the like comprising a stuffing box, a compressible bushing having a bore, the lining of which comprises a plurality of overlapping flexible annular barbs with substantially square cut ends, all slanting in one direction for engagement with a line whereby the barbs will be compressed against the line on passage of the latter in one direction and will be released on passage of the line in the other direction.

3. A packing for oil savers and the like comprising a bushing formed of elastic material and having a bore, the lining of which comprises a plurality of overlapping annular barbs with substantially square cut ends, all slanting in one direction for engagement with a line whereby the barbs will be compressed against the line on passage of the latter in one direction and will be released on passage of the line in the other direction.

4. A packing for oil savers and the like comprising a compressible bushing having a bore, the lining of which comprises a plurality of overlapping flexible annular barbs, with substantially square cut ends, all slanting in one direction for engagement with a line whereby the barbs will be compressed against the line on passage of the latter in one direction and will be released on passage of the line in the other direction, said bushing having a stop to prevent the barbs from passing over center.

5. A packing for oil savers and the like comprising a bushing formed of elastic material and having a bore, the lining of which comprises a plurality of overlapping annular barbs with substantially square cut ends, all slanting in one direction for engagement with a line whereby the barbs will be compressed against the line on passage of the latter in one direction and will be released on passage of the line in the other direction, said bushing having a stop to prevent the barbs from passing over center.

6. A stuffing box for oil savers and the like comprising a body having a tapered packing pocket, a packing bushing snugly fitted in said pocket having a bore with flexible annular barbs with substantially square cut ends, all slanting in one direction for engagement with a line whereby the barbs will be compressed against the line on passage of the latter in one direction and will be released on passage of the line in the other direction, and a gland mounted in said body at the large end of said pocket to compress said packing.

7. A stuffing box for oil savers and the like comprising a body having a tapered packing pocket, a compressible packing bushing snugly fitted in said pocket and having a bore, the lining of said bushing having a plurality of overlapping flexible annular barbs with substantially square cut ends, all slanting in one direction for engagement with a line whereby the barbs will be compressed against the line on passage of the latter in one direction and will be released on passage of the line in the other direction, and a gland mounted in said body at the large end of said pocket to compress said packing.

8. A stuffing box for oil savers and the like comprising a body having a tapered packing pocket, a packing bushing snugly fitted in said pocket formed of elastic material and having a bore, the lining of said bushing having a plurality of overlapping annular barbs with substantially square cut ends, all slanting in one direction for engagement with a line whereby the barbs will be compressed against the line on passage of the latter in one direction and will be released on passage of the line in the other direction, and a gland mounted in said body at the large end of said pocket to compress said packing.

9. A stuffing box for oil savers and the like comprising a body having a tapered packing pocket, a compressible packing bushing snugly fitted in said pocket and having a bore, the lining of said bushing having a plurality of overlapping flexible annular barbs with substantially square cut ends, all slanting in one direction for engagement with a line whereby the barbs will be compressed against the line on passage of the latter in one direction and will be released on passage of the line in the other direction, and a gland mounted in said body at the large end of said pocket to compress said packing, said bushing having a stop to prevent the barbs from passing over center.

10. A stuffing box for oil savers and the like comprising a body having a tapered packing pocket, a packing bushing snugly fitted in said pocket formed of elastic material and having a bore, the lining of said bushing having a plurality of overlapping annular barbs with substantially square cut ends, all slanting in one direction for engagement with a line whereby the barbs will be compressed against the line on passage of the latter in one direction and will be released on passage of the line in the other direction, and a gland mounted in said body at the large end of said pocket to compress said packing, said bushing having a stop to prevent the barbs from passing over center.

In witness that I claim the foregoing I have hereunto subscribed by name this 27th day of February, 1931.

GORDON SAUNDERS.